UNITED STATES PATENT OFFICE.

JOHN H. RYAN, OF TWIN FALLS, IDAHO, ASSIGNOR OF ONE-HALF TO JAS. H. BILLINGSLEY, OF GALENA, ILLINOIS.

METHOD OF PRESERVING FRUIT-JUICES.

1,182,213.  Specification of Letters Patent.  Patented May 9, 1916.

No Drawing.  Application filed October 25, 1915.  Serial No. 57,901.

*To all whom it may concern:*

Be it known that I, JOHN H. RYAN, a citizen of the United States, residing at Twin Falls, in the county of Twin Falls and State of Idaho, have invented certain new and useful Improvements in Methods of Preserving Fruit-Juices, of which the following is a specification.

This invention relates to methods of preserving perishable organic products, and particularly fruit juices, the object of the invention being to provide a method whereby such products may be indefinitely preserved without alteration of their normal flavor and aroma. The method is dependent upon the combined application of the ultra-violet ray and carbon dioxid, preferably applied successively to a fresh juice of normal acidity.

The method has been successfully applied to the preservation of the fresh acid juices of the lemon, orange and grape, but its application is not restricted to these particular fruit juices.

The method is preferably carried out substantially as follows:—The fresh fruit, from which the skin and seeds may have been removed, is first subjected to pressure in any suitable type of press, whereby the juice is obtained admixed with fine pulp. The effectiveness of the treatment hereinafter described is largely dependent upon the complete removal of the suspended pulp, inasmuch as this contains the highly fermentable portions of the fruit, and perhaps also the fermentive organisms or bodies. Ordinary filtration will not usually suffice for removing the pulp, but a sufficient elimination may in most cases be obtained by a centrifugal treatment, for example in a cream separator. If necessary this may be supplemented by the known process of freezing, whereby some concentration of the juice is also effected. Heat should not be employed, as leading to a loss of the delicate flavor and aroma of the normal juice.

After clarifying the juice, it is subjected to the action of the ultra-violet ray, preferably from a quartz mercury-vapor lamp, or equivalent source of highly actinic light. It is sufficient for this purpose to allow the juice to flow slowly in proximity to the lamp through a sluice or trough made of or lined with a material unaffected by the fruit acids. While my invention is not dependent upon any particular form of apparatus, it is desirable that the bottom of the sluice should be provided with corrugations or riffles having for their effect to bring all portions of the juice successively to the surface and therefore under the immediate influence of the rays. The lamp is of course provided with the usual reflector for projecting the rays downward upon the liquid.

I have found by prolonged studies over a period of years that although a juice treated as above is subjected to change if exposed to the air for any considerable period, it is not subject to fermentation or other change in the presence of carbon dioxid. My next step consists therefore in charging the juice with carbon dioxid. This is carried out in any suitable tank to which the carbon dioxid may be admitted under pressure. The juices are bottled or introduced into other sealed containers directly from this tank.

It is characteristic of fruit juices treated as above described that they are not merely capable of indefinite preservation in sealed containers, but they are not liable to alteration for long periods after the containers have been opened or partially emptied. This is attributed to the fact that the upper portion of the partially filled container is filled with carbon dioxid rising from the juice, and that under the law of partial pressures a sufficient proportion of carbon dioxid is retained in solution in the juice to inhibit fermentation or other deleterious changes.

It has been my experience that the ultra-violet ray is of itself ineffective to preserve these juices unless supplemented by the treatment with carbon dioxid; and the carbon dioxid treatment is of itself quite insufficient to preserve the juices unaltered as to flavor and aroma. The combination of the two treatments is however highly effective.

While I have described these treatments as successively applied, I do not desire to restrict myself to this, inasmuch as it is possible to apply the ultra-violet ray and the carbon dioxid treatment either simultaneously, or in inverse order. I believe, however, that the conjoined action of the ultra-violet ray and carbon dioxid is essential to the indefinite preservation of these organic products in their normal state. It is especially to be noted that according to the present process it is unnecessary and undesirable to apply heat to effect sterilization, as thereby the normal flavor is changed.

While the invention is particularly intended for the preservation of fruit juices in their condition of normal acidity, it is not restricted thereto, inasmuch as like results are obtainable with other perishable food-products, such as milk.

I claim:—

1. The method of treating fruit juices, which consists in removing the pulp from the expressed juices, subjecting the clarified juice of normal acidity to the action of the ultra-violet ray, and charging the same with carbon dioxid.

2. The method of treating fruit juices, which consists in subjecting the expressed juice to centrifugal action until the pulp is completely removed, then agitating the juice while subjected to the influence of ultra-violet rays, and thereafter charging the juice with carbon dioxid under pressure.

In testimony whereof I affix my signature.

JOHN H. RYAN.